W. M. SMITH.
HOSE COUPLING.
APPLICATION FILED FEB. 17, 1916.
1,247,464.
Patented Nov. 20, 1917.
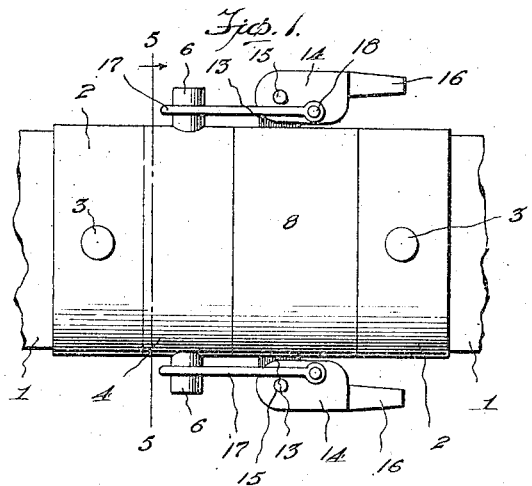
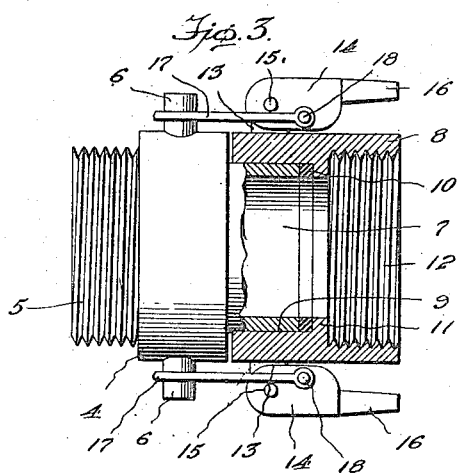
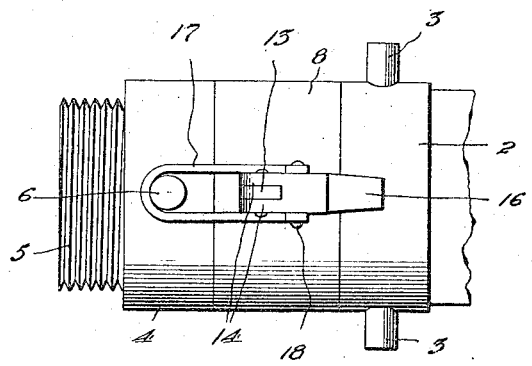
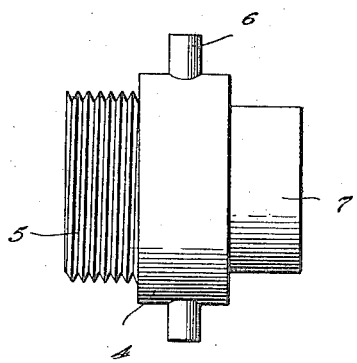
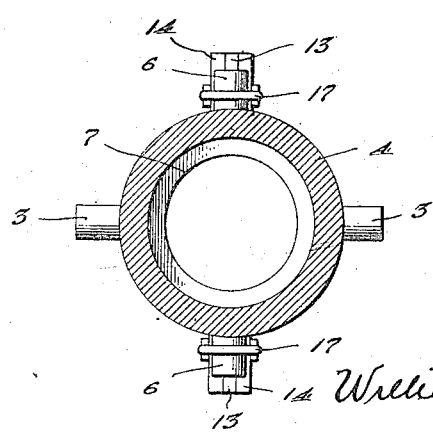
Witness
Paul M. Hunt
Inventor
William M. Smith
By E. N. Hamlin
Attorney

UNITED STATES PATENT OFFICE.

WILLIAM M. SMITH, OF EVANSVILLE, INDIANA, ASSIGNOR OF ONE-HALF TO CHAS. C. BILLINGSLEY, OF GIBSON, INDIANA.

HOSE-COUPLING.

1,247,464.  Specification of Letters Patent.  Patented Nov. 20, 1917.

Application filed February 17, 1916. Serial No. 78,857.

*To all whom it may concern:*

Be it known that I, WILLIAM M. SMITH, a citizen of the United States, residing at Evansville, county of Vanderburgh, and State of Indiana, have invented certain new and useful Improvements in Hose-Couplings, of which the following is a specification.

This invention relates to hose couplings.

My object is to provide a novel, quick attachable and detachable coupling for fire hose, steam hose and air brake hose, which will embody draw links, self-locking levers, and lugs combined together in an improved manner, enabling rapid coupling by engaging the draw links with the lugs and moving the levers to locking position; uncoupling being accomplished by reversal of the foregoing operations. My invention does away with screwing together of the parts and affords a tight and secure joint in connection with any suitable gasket which may be employed.

One embodiment of the invention is set forth hereinafter, but as modifications may be resorted to, I do not limit myself to the details of the structure described and shown.

In the accompanying drawings:

Figure 1 is a side elevation;

Fig. 2, a view taken at right-angles to Fig. 1, looking down on the draw links;

Fig. 3, a side elevation of the coupling alone, with certain parts in section;

Fig. 4, a detail of a part of the coupling; and

Fig. 5, a section on line 5—5, Fig. 1.

The hose ends 1 are provided with ordinary unions 2 having lugs 3 for application of any suitable spanner.

My improved coupling is shown detached in Fig. 3 and adapted for connection to the usual unions 2. There is a coupling head 4 having a screw-threaded nipple 5 to engage the left-hand union 2, this head being provided with lugs 6 at diametrically opposite points. The head also has a tubular externally smooth nipple 7. The coupling sleeve 8 has an interiorly smooth socket 9 which snugly receives the nipple 7, there being provided a gasket 10 of any suitable construction interposed between the inner end of the nipple 7 and the shoulder 11 of the sleeve 8. The sleeve has an internal screw-thread 12 to receive the screw-thread on the right-hand union 2. The sleeve 8 is provided with diametrically opposite lugs 13. Locking levers 14 have a bifurcated end straddling the lug 13 and pivoted thereto at 15. These levers are preferably short so as to afford no appreciable projection, and their ends 16 may be tapered and either round or square in cross-section to fit into the socket of any suitable operating handle which may be provided to afford a suitable leverage when it is desired to lock the levers on their pivots to couple or uncouple the device. Draw links 17 are pivoted to 18 to opposite sides of the levers 14 in eccentric or offset arrangement to pivots 15. These draw links are of such length that after they have been slipped over the lugs 6, on pressing the levers 14 down into substantial parallelism with the sleeve 8, the pivots 18 pass below the plane of the pivots 15 and thus hold the links and levers in locked or set position. The tension exerted during this locking operation, causes the nipple 7 to press against the gasket 10 and place the latter under compression, and when the levers are down, as shown in Fig. 3, the coupling is securely locked.

My invention is particularly adapted for use as a quick attachable and detachable coupling for fire hose and for steam and air brake hose used on trains, but it may be used on garden hose or as a pipe coupling in any connection.

Having thus described my invention, what I claim as new and desire to secure by Letters Patent, is:—

In a hose coupling, the combination with hose ends having ordinary screw-threaded unions, of a complete, self-contained coupling device for connecting said unions, comprising a coupling head provided with diametrically opposite radial cylindrical lugs and also having a freely projecting nipple, a coupling sleeve having an unobstructed socket containing a gasket and adapted to freely receive said nipple by endwise insertion, said nipple being adapted to bear upon the gasket when the head and sleeve are coupled as aforesaid, lugs on opposite sides of the sleeve located inwardly from the end thereof, locking levers having tapered ends adapted to detachably receive the same tool, said levers being pivoted to the lugs on said sleeve and disposed wholly inwardly from the end of the sleeve, and draw links straddling, and pivoted to, said levers and having rounded parts adapted to bridge the joint between the nipple and sleeve and to engage the cylindrical lugs on the coupling head when the levers are pressed down, to thereby cause the sleeve to press the gasket at opposite points, the pivotal connections between the draw links and the levers being arranged to lie closer to the coupling member than the pivots of said levers, when the levers are down, whereby the levers and links are self-locking, said coupling head and sleeve each having a screw-threaded part adapted to engage the respective unions aforesaid.

In testimony whereof, I hereunto affix my signature.

WILLIAM M. SMITH.